Feb. 27, 1962 D. LOEV 3,023,401

REVERSIBLE SHIFT REGISTER

Original Filed Aug. 30, 1954

INVENTOR.
DAVID LOEV
BY Laurence R. Brown
ATTORNEY 3,023,401
REVERSIBLE SHIFT REGISTER David Loev, Plymouth Meeting, Pa., assignor to Burroughs Corporation, Detroit, Mich., a corporation of Michigan Continuation of application Ser. No. 452,753, Aug. 30, 1954. This application Sept. 23, 1958, Ser. No. 763,157
4 Claims. (Cl. 340—174)

This application is a continuation of my co-pending application, Serial No. 452,753, filed August 30, 1954, now abandoned.

This invention relates to storage devices and more particularly it relates to magnetic storage elements operable in shift register circuits.

Magnetic storage elements have been used as switching devices and shift register circuits in the prior art. Many well known devices have been constructed in a manner similar to the registers described by A. D. Booth in an article entitled "An Electronic Digital Computer" appearing in Electronic Engineering for December 1950. The magnetic swtching elements of these registers have cores exhibiting a substantially rectangular hysteresis characteristic. The two states of the magnetic remanence provided by these cores enable them to efficiently store binary information, until removed by an interrogation signal which establishes the remanence condition of the core to a predetermined reference polarity. When an element is in the reference storage state, little voltage will be induced in windings about the core by the interrogation signals. However, when the storage state is opposite that of the interrogation signal, a large output signal is produced by the interrogating signal.

Improved prior art magnetic shift registers have been proposed for shifting information in two directions along the shift register circuit. One such system, as described in the copending application of John O. Paivinen, filed March 31, 1954, Serial No. 420,135, now abandoned in favor of continuation application Serial No. 762,863, filed September 23, 1958, and assigned to the same assignee as applicant's assignee, shows a reversible shift register circuit. Bidirectional shifting of information at will is made possible by introducing conditional transfer coupling circuits between two adjacent storage elements. These conditional transfer coupling circuits permit the storage of information in any element of the shift register independent of transfer of information along the register. The transfer of information is effected only when the conditional transfer circuit is energized. Thus, two transfer circuits coupled between each adjacent pair of storage elements permit information to proceed independently along separate transfer circuits in opposite directions dependent upon the selective energization of one or the other transfer circuit. However, in such systems two separate transfer windings and associated coupling components are necessary for each element.

It is accordingly an object of this invention to provide improved and simplified circuits for bi-directional transfer of information between binary storage elements.

It is a more specific object of the invention to provide an improved magnetic shift register capable of bi-directional transfer of information along a single coupling circuit.

In accordance with a preferred embodiment of the present invention, therefore, there is provided a magnetic shift register having a plurality of static storage elements coupled in cascade by means of a single coupling circuit for translating stored information along the register. Two adjacent cores are utilized for storing each bit of binary information. Thus, each element is cleared with one interrogating or shifting pulse before information is introduced into that element from an adjacent element in response to a further shift pulse arriving during a separate time period. Each of the two elements coupled by a conditional transfer loop is enabled to pass information from one element to the other only in response to a predetermined gating signal. Each of the alternate elements of the shift register are coupled into a first set of elements for interrogation by a first group of shift pulses, and the remaining elements are coupled into a second set of elements for actuation by a further group of shift pulses arriving at a separate time. Alternate shift pulses to the two sets of elements cause information to progress along the register. In accordance with the present invention, therefore, information is caused to pass in either direction from one element to the other along the shift register circuit. The direction of propagation is desginated by selection of a conditional transfer or gating signal arriving in time coincidence with one or the other of the respective groups of shift pulses.

Further objects and features of the invention will be found throughout the following more detailed discussion of the invention, particularly when considered in connection with the accompanying drawing, in which.

Figure 1:
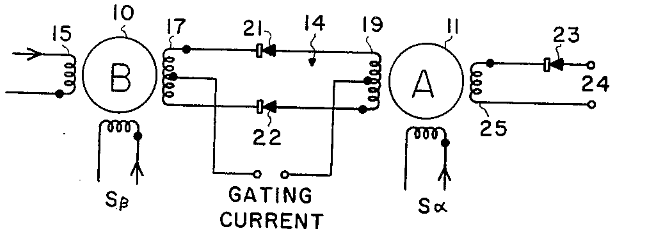
FIG. 1 is a schematic circuit diagram of a magnetic storage circuit embodying the invention.

Referring now to the drawing, a pair of magnetic storage elements 10 and 11 which may be ring-shaped cores are indicated schematically by circles. These elements are respectively designated B and A to correspond to a pair of adjacent elements of the shift register circuit for storing a single binary bit of information which in a long shift register are coupled in alternate sets of elements. One set of elements is used for temporarily retaining information removed from the other set of elements. In this manner, alternating shift pulses in the sequence $S\alpha$ and $S\beta$ respectively clear information from element 11 and interrogate element 10 to cause a transfer of the information contained in element 10 to element 11. This latter transfer will occur only if gating current is passing through the conditional transfer coupling circuit 14, as will hereinafter be described in more detail.

The dot notation on each of the windings designates the manner in which it is wound about the magnetic element. It may be assumed that current entering a dotted terminal will establish a binary storage condition of "0" in the magnetic elements. Thus, the arrowheads are used to indicate the direction of the current entering the windings. The shift current desingated $S\alpha$ and $S\beta$ thus indicates that the reference condition of each element will be established in the "0" binary state.

However, information current at the input winding 15 of element 10 produces a flux which causes the element to attain the opposite binary "1" storage state. As the shift pulse $S\beta$ is applied causing the element to return to the "0" reference state, a signal potential will be induced in all windings and therefore will appear across the "output" winding 17. Since this winding 17 is a tapped winding, and rectifiers or other unidirectional devices are coupled in each of the two outer leads in the same polarity, the signal induced in the output winding cannot be caused to circulate through the conditional transfer circuit 14 to the winding 19 about element 11 in the absence of a gating current entering the taps of the windings. However, assume that a gating current is flowing in the transfer loop 14 at the time of interrogation by $S\beta$ pulses. In the absence of interrogation, the gating current flows into the center tap of "input" winding 19 of element 11 splitting equally into the two branch paths, thereby passing through the rectifiers 21 and 22 and emerging at the center tap of output winding 17 of element 10. Because of the branch paths the flux set up at each magnetic element by each half of the winding will cancel resulting in a net flux of zero, and therefore the storage state of the elements will not be disturbed. However, as a potential is induced in output winding 17 during interrogation because of a stored digit "1" in element 10, it causes an unbalance of gating current flow through the upper and lower branches the transfer circuit. This unbalanced current flow in the input winding 19 of core 11 is in such a direction that the core is magnetically saturated thereby causing a "1" to be stored in element 11. This is effectively a shift of information from element 10 to element 11. The stored "1" may thereafter be read out of element 11 by the interrogation pulse Sα which unconditionally produces a signal at the output terminals 24 by means of the conventional single ended output winding 25. As in conventional shift register practice, the rectifiers are poled for passing information from one element to the next. From this discussion it is seen, therefore, that as long as the gating current is caused to occur in coincidence with the Sβ interrogating pulses, stored information may be passed from element 10 to element 11. If a "0" is stored in element 10, little potential is induced to cause gating current unbalance and the element 11 will remain in its "0" reference state.

Consider now the operation of the conventional output winding 25 of element 11. Because of diode 23 an output signal is produced only when the storage state is returned to its "0" storage state from its "1" storage state. Therefore information may only pass out of winding 25. However, the tapped windings 17 and 19 may either receive or deliver information since the unbalance of gating curent may occurs in two directions depending upon the polarity of the induced potential effecting the unbalance. Therefore between elements 10 and 11 the information may be passed in either direction as hereinafter explained. Thus the term "output" winding hereinbefore applied to winding 17 would be more precisely termed input-output winding and in a similar manner the term "input" winding applied to winding 19 would more precisely be termed an "input-output" winding.

In order to cause information to pass in an opposite direction from element 11 to element 10, the gating current must be provided in time coincidence with the interrogating pulse Sα rather than Sβ. Thus, the current flowing through the conditional transfer circuit 14 will cause an unbalance of flux in the split winding 17 of element 10, which now becomes the input winding, to thereby store in the information contained in element 11 in a manner identical with that hereinbefore discussed. Thereby, effectively a system may be provided in accordance with the present invention for using the same circuits for selectively gating information in either direction between a plurality of coupled magnetic units.

Figure 2:
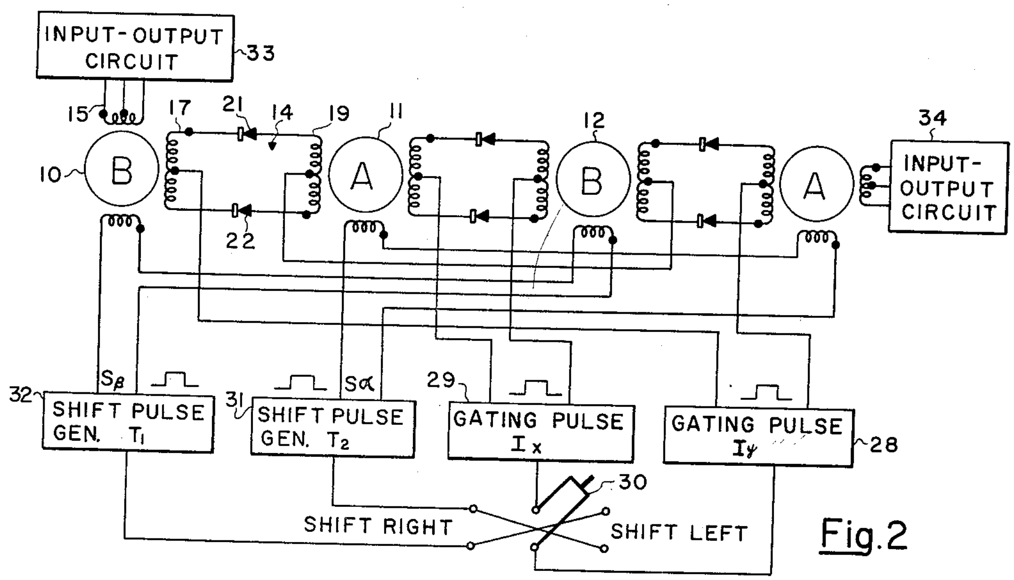
FIG. 2 is a schematic diagram of a reversible magnetic shift register system embodying the invention.
Figure 3:
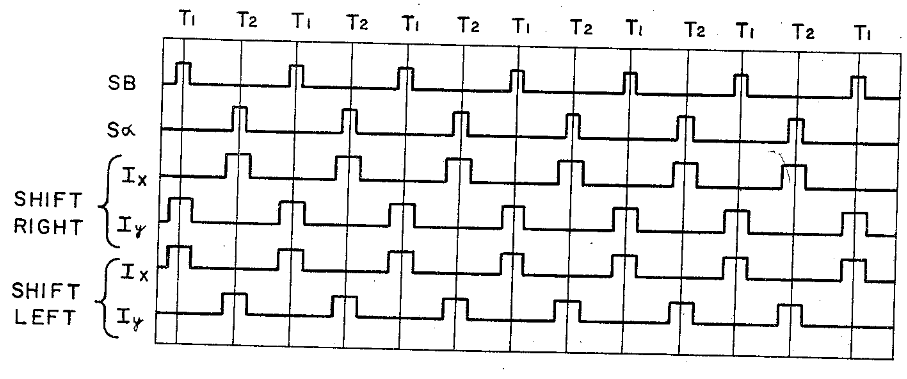
FIG. 3 is a waveform chart indicating the manner of providing operating pulses to the shift register in order to produce bi-directional shifting of information.

In FIG. 2 several magnetic elements are shown connected in a reversible shift register system. The manner of transfer of information between element 10 to element 11 is hereinbefore described. The gating pulse for the conditional transfer circuit 14 is provided by the triggered gating pulse forming circuit generator 28 which produces a gating pulse $I_y$ in a time sequence comparison with the alternate periodic shift pulses Sα and Sβ arriving respectively from shift pulse generators 31 and 32 in the time periods $T_2$ and $T_1$, as shown in FIG. 3. Thus, as the reversing switch 30 (which may take other forms obvious to those skilled in the art) is closed in the position labelled "shift left," the gating pulse $I_y$ will coincide with the shift pulse Sα and cause information to be passed from element 11 to element 10. Conversely, if the reversing switch 30 is closed in the position labelled "shift right," the gating pulse $I_y$ will coincide with the shift pulse Sβ and cause information to be passed from element 10 to element 11. In a similar manner the gating pulse $I_x$ is formed in generator 29 to successively pass information from element 11 to element 12 or vice versa. Thus, information may be passed from the first input-output circuit 33 to the second input-output circuit 34 by selectively exciting the conditional transfer circuits of alternate elements during time periods corresponding to different ones of the sets of interrogating pulses Sα and Sβ.

Any of the suitable pulse generators well known in the present art may be used producing substantially square wave pulses in a particular timed relationship, and therefore all the pulse generators are shown in block diagram form to more distinctly point out the novel features contributed by the present invention.

It is to be recognized in accordance with the foregoing principles that it is possible by means of the present invention to provide a reversible shift register circuit having a single transfer circuit along the register. Circuits for selectively actuating the shift register automatically may be constructed to fit the requirements of basic control circuitry of many different types of existing computer circuits and being capable of construction by those skilled in the art after understanding the operation of the present invention and are therefore not discussed. Having therefore described the invention and its operation, those features of novelty believed descriptive of its nature and scope are defined with particularity in the appended claims.

What is claimed is:

1. In a reversible shift register, a pair of magnetic cores each capable of assuming either of two stable states of magnetic remanence one of which is a reference state, each of said cores having at least a core-switching winding and a transfer winding coupled thereto, said windings being included in separately controllable core-switching and transfer circuits, each of said transfer windings having a tap at substantially the midpoint thereof; a first asymmetrically conducting device connecting one ond of the transfer winding of one core of the pair to one end of the transfer winding of the other core of the pair; a second asymmetrically conducting device connecting the other end of the transfer winding of said one core to the other end of the transfer winding of said other core, thereby to form two parallel paths between said cores which in combination with said transfer windings form a transfer loop, said first and second asymmetrically conducting devices being opposingly poled to prevent current flow around said loop; means connected between the tap points of said transfer windings of said pair of cores for driving gating currents through said parallel paths in the same direction during a first time period, the circuit parameters being such that in the absence of bias applied to said asymmetrically conducting devices the gating currents in said parallel paths are substantially equal thereby to apply substantially equal and opposing magnetizing forces to each of said cores; circuit switch means for driving during said first time period core-switching current selectively through the core-switching winding of one or the other of said cores as selected by said circuit switch means to switch or to tend to switch the selected core to said reference state, thereby in response to the actual switching of said selected core to induce a voltage in its transfer winding to reverse bias one of said asymmetrically conducting devices and to forward bias the other, thereby to cause gating currents flowing through said parallel paths to be unequal, thereby to apply a net magnetizing force to said non-selected core of sufficient magnitude to switch said non-selected core, whereby the switching of said non-selected core in response to the switching of said selected core is effected but only in the presence of said gating current.

2. A reversible shift register comprising a plurality of magnetic cores each capable of assuming either of two stable states of magnetic remanence one of which represents a binary "0" and the other of which represents a binary "1," each of said cores having a core-switching winding and at least one transfer winding coupled thereto, said windings being included in separately controllable core-switching and transfer circuits, the transfer winding having a tap at an intermediate point whereby to divide said transfer winding into an upper section and a lower section; means, including a first asymmetrically conducting device, connecting the end of the upper section of the transfer winding of each core to the end of the upper section of transfer winding of the adjacent core; means, including a second asymmetrically conducting device, connecting the end of the lower section of the transfer winding of each core to the end of the lower section of the transfer winding of the adjacent core, thereby to form two parallel paths between adjacent cores which in combination with said transfer windings form a transfer loop interconnecting adjacent cores, said first and second asymmetrically conducting devices being opposingly poled to prevent current flow around said loop; means connected between the tap points of the transfer windings of a transfer loop interconnecting adjacent cores for driving gating currents at selected time periods through said parallel paths of said loop in the same direction, the circuit parameters being such that in the absence of bias applied to said asymmetrically conducting devices the gating currents in said parallel paths are substantially equal thereby to apply substantially equal and opposing magnetizing forces to each of said adjacent cores associated with said loop, said last-named means comprising means for driving gating currents through adjacent transfer loops during different time periods; means connecting the core-switching windings of alternate cores in series in a first circuit; means connecting the core-switching windings of the other alternate cores in series in a second circuit; circuit switch means for driving core-switching current selectively through said first circuit during a first time period and through said second circuit during a second time period or through said second circuit during a first time period and through said first circuit during a second time period as selected by said circuit switch means to switch or to tend to switch the cores associated with each said circuit to the "0" state during a different time period, thereby in response to the actual switching of a core to induce a voltage in its transfer winding or windings to forward bias one of the asymmetrically conducting devices of the transfer loop or loops associated therewith and to reverse bias the other asymmetrically conducting device of the transfer loop, thereby to cause any gating currents which are flowing through the parallel paths of the transfer loop on one side of said switching core during such time period to become unequal and thereby to apply a net magnetizing force to the adjacent core associated with that transfer loop of sufficient magnitude to switch said adjacent core from the "0" to the "1" state, whereby switching of a core in response to said core-switching current is effective to switch an adjacent core located on one side or the other of said switching core according to and only in the presence of gating currents in the transfer loop interconnecting said cores.

3. Apparatus as claimed in claim 2 characterized in that means are provided for applying an input signal to either end core of the register, and further characterized in that means are provided for deriving an output signal from either of said end cores.

4. A reversible shift register comprising, a series of magnetic cores including a first, second and intermediate magnetic core for storing binary bits, each capable of assuming either of two stable states of magnetic remanence representative of two binary storage states, one of which is a reference state, each of said cores having at least a core-switching winding and a first and a second transfer winding coupled thereto, said windings being included in separately controllable core-switching and transfer circuits, a separate source of gating signals for the transfer circuit on either side of said intermediate core, said first and second transfer windings of said intermediate core and said second and first transfer windings of said first and second cores respectively being connected together at their respective outer ends to form two said transfer circuits, a pair of terminals associated with each of said transfer circuits located at substantially diametrically opposed points in said transfer circuits and each of said pair of terminals connected with said separate source of gating signals so as to form respectively closed transfer loops with balanced parallel conductive paths each having current selectively provided from said gating sources entering at one of said pair of terminals, dividing along said parallel paths and leaving from said other of said pair of terminals returning to said gating source, sources of core-switching signals connected to said core-switching windings of alternate of said cores to establish said reference state in each of said cores, switching means for selectively applying said one gating signal and said first core switch signal to enable the transfer of the storage state of said first core to said intermediate core along said one transfer loop in a first direction, said switching means selectively applying said intermediate core switching and said one gating signal to enable the transfer of the storage state of said intermediate core to said first core along said transfer loop in the opposite direction, said first transfer winding on said first core being adapted to receive the transfer of the storage state of a preceding magnetic core when said switching means allows for transfer in said first direction, and to provide a transfer of the storage state of said first core to said preceding magnetic core when said switching means allows for transfer in said opposite direction, said second transfer winding on said intermediate core being adapted to provide a transfer of the storage state of said intermediate core to said second magnetic core when said switching means allows for transfer in said first direction and to receive the transfer of the storage state of said second magnetic core when said switching means allows for transfer in said opposite direction.

References Cited in the file of this patent

UNITED STATES PATENTS

| | | |
|---|---|---|
| 2,683,819 | Rey | July 13, 1954 |
| 2,781,503 | Saunders | Feb. 12, 1957 |
| 2,831,150 | Wright et al. | Apr. 15, 1958 |